US010225776B2

(12) United States Patent
Han et al.

(10) Patent No.: US 10,225,776 B2
(45) Date of Patent: Mar. 5, 2019

(54) METHOD FOR CONFIGURING SERVING CELL IN DUAL CONNECTIVITY, USER EQUIPMENT, AND BASE STATION

(71) Applicant: Huawei Technologies Co., Ltd., Shenzhen (CN)

(72) Inventors: Jing Han, Beijing (CN); Jie Cui, Shenzhen (CN); Anjian Li, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 31 days.

(21) Appl. No.: 15/470,659

(22) Filed: Mar. 27, 2017

(65) Prior Publication Data
US 2017/0201917 A1 Jul. 13, 2017

Related U.S. Application Data

(63) Continuation of application No. PCT/CN2014/087699, filed on Sep. 28, 2014.

(51) Int. Cl.
*H04W 36/08* (2009.01)
*H04W 76/25* (2018.01)
(Continued)

(52) U.S. Cl.
CPC ........... *H04W 36/08* (2013.01); *H04L 1/1816* (2013.01); *H04L 5/0035* (2013.01);
(Continued)

(58) Field of Classification Search
CPC ............ H04L 1/18; H04L 5/00; H04W 72/12; H04W 76/02; H04W 76/04; H04W 76/06; H04W 36/08
See application file for complete search history.

(56) References Cited

U.S. PATENT DOCUMENTS

2012/0076039 A1* 3/2012 Kwon ................... H04B 7/026
370/252
2014/0192740 A1 7/2014 Ekpenyong et al.
(Continued)

FOREIGN PATENT DOCUMENTS

CN 103987124 A 8/2014

OTHER PUBLICATIONS

NTT DOCOMO, et al., "System Information and SFN Handling for Dual Connectivity", 3GPP TSG-RAN WG2 #85bis, R2-141101 Mar. 31-Apr. 4, 2014, Valencia, Spain, 1 page.
(Continued)

*Primary Examiner* — Anez C Ebrahim
(74) *Attorney, Agent, or Firm* — Slater Matsil, LLP

(57) ABSTRACT

Embodiments provide a method for configuring a serving cell in dual connectivity, user equipment, and a base station. According to the method, a master eNodeB sends RRC connection reconfiguration signaling to the user equipment, where the RRC connection reconfiguration signaling carries indication information used to indicate whether an SFN of the master eNodeB and an SFN of the secondary eNodeB have same parity, or carries an SFN of the secondary eNodeB. The UE executes primary secondary cell pSCell configuration at the secondary eNodeB according to the RRC connection reconfiguration signaling. The UE may determine parity of the SFN of the secondary eNodeB according to the received indication information or the SFN of the secondary eNodeB, and then the UE performs random access to the SeNB.

16 Claims, 11 Drawing Sheets

(51) Int. Cl.
- *H04W 76/19* (2018.01)
- *H04W 76/36* (2018.01)
- *H04L 1/18* (2006.01)
- *H04L 5/00* (2006.01)
- *H04W 72/12* (2009.01)

(52) U.S. Cl.
CPC .......... *H04L 5/0055* (2013.01); *H04L 5/0094* (2013.01); *H04W 72/1289* (2013.01); *H04W 76/19* (2018.02); *H04W 76/25* (2018.02); *H04W 76/36* (2018.02)

(56) References Cited

U.S. PATENT DOCUMENTS

| | | |
|---|---|---|
| 2014/0286243 A1 | 9/2014 | Yamada |
| 2015/0304909 A1* | 10/2015 | Yoshimoto ........ H04W 36/0061 370/331 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211, V12.3.0, Sep. 2014, 124 pages.

Ericsson, "pSCell Activation and Configuration in Dual Connectivity," 3GPP TSG RAN WG4 Meeting #72, R4-144827, Dresden, Germany, Aug. 18-22, 2014, 4 pages.

Huawei et al., "Further Analysis on Configuration/Activation Time for pSCell," 3GPP TSG-RAN WG4 Meeting #72, R4-144493, Dresden, Germany, Aug. 18-22, 2014, 4 pages.

NEC, "Stage 2 Open Issues for Dual Connectivity," 3GPP TSG-RAN WG3#85, R3-141786, Dresden, Germany, Aug. 18-22, 2014, 12 pages.

Samsung, "SFN Handling for Dual Connectivity," 3GPP TSG RAN WG2 #85, R2-140412, Prague, Czech Republic, Feb. 10-14, 2014, 2 pages.

* cited by examiner

METHOD FOR CONFIGURING SERVING CELL IN DUAL CONNECTIVITY, USER EQUIPMENT, AND BASE STATION

CROSS-REFERENCE TO RELATED APPLICATIONS

This application is a continuation of International Application No. PCT/CN2014/087699, filed on Sep. 28, 2014, the disclosure of which is hereby incorporated by reference in its entirety.

TECHNICAL FIELD

Embodiments of the present invention relate to the communications field, and in particular, to a method for configuring a serving cell in dual connectivity, user equipment, and a base station.

BACKGROUND

In an Evolved Universal Terrestrial Radio Access Network (E-UTRAN), user equipment (UE) in a connected state may support dual connectivity (DC). UE with multiple transmit antennas and multiple receive antennas (Receive/Transmit, RX/TX) may use radio resources provided by two separated schedulers, and the two schedulers are located at two evolved NodeBs (eNB). The two eNBs are connected by using an X2 interface. One eNB is used as a master eNodeB (MeNB) and the other one is used as a secondary eNodeB (SeNB). In a DC scenario, a primary secondary cell (pSCell) is located at the SeNB, and the primary secondary cell is in an active state once being configured, and cannot be deactivated, that is, pSCell configuration and activation are completed at the same time. The process is different from that of secondary cell (SCell) activation in a carrier aggregation (CA) scenario. In the CA scenario, after being configured, the SCell is first in a deactivated state, then is activated by using an activation command, and can be deactivated by using a deactivation command.

According to an existing technical solution, when pSCell configuration is completed, UE needs to perform random access to an SeNB, and the pSCell configuration is not considered to be completed before a network side receives random access information sent by the UE at a pSCell. If a random access message needs to be sent on a radio frame (configuring 0, 1, 2, 15, 16, 17, 18, 31, 32, 33, 34, 47, 48, 49, 50, and 63 for a PRACH) corresponding to a case in which a system frame number (SFN) of the SeNB corresponding to the target cell pSCell is an even number, during the random access, the UE needs to read a physical broadcast channel (PBCH) of the SeNB to obtain the SFN of the SeNB, and then determines parity of the SFN of the SeNB, so as to send the random access message on the radio frame corresponding to a case in which the SFN is an even number. A time for obtaining the SFN is 50 ms, and accordingly, it takes a relatively long time to complete the pSCell configuration.

SUMMARY

According to a method for configuring a serving cell in dual connectivity, user equipment, and a base station that are provided in embodiments of the present invention, when performing random access to an SeNB, UE may determine parity of an SFN of the SeNB without a need of reading a PBCH of the SeNB, thereby reducing a time for completing pSCell configuration.

According to a first aspect, an embodiment of the present invention provides a method for configuring a serving cell in dual connectivity. The method includes receiving, by user equipment UE, radio resource control connection reconfiguration (RRC connection reconfiguration) signaling sent by a master eNodeB MeNB, where the RRC connection reconfiguration signaling is used to instruct the UE to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity. The method also includes selecting, by the UE, a radio frame and a radio subframe from physical random access channel PRACH configuration according to the received indication information or the SFN of the SeNB, to perform random access to the SeNB.

With reference to the first aspect, in a first possible implementation manner, when the RRC connection reconfiguration signaling includes the indication information, the selecting, by the UE, a radio frame and a radio subframe from physical random access channel PRACH configuration according to the received indication information, to perform random access to the SeNB specifically includes: determining, by the UE, whether the SFN of the SeNB is an odd number or an even number according to the received indication information and the SFN of the MeNB; and if the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

With reference to the first aspect, in a second possible implementation manner, when the RRC connection reconfiguration signaling includes the SFN of the SeNB, the selecting, by the UE, a radio frame and a radio subframe from physical random access channel PRACH configuration according to the SFN of the SeNB, to perform random access to the SeNB specifically includes: if the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

According to a second aspect, an embodiment of the present invention provides a method for configuring a serving cell in dual connectivity. The method includes determining, by a master eNodeB MeNB, radio resource control RRC connection reconfiguration signaling, where the RRC connection reconfiguration signaling is used to instruct user equipment UE to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity. The method also includes sending, by the MeNB, the RRC connection reconfiguration signaling to the UE.

According to a third aspect, an embodiment of the present invention provides a method for configuring a serving cell in dual connectivity. The method includes receiving, by user equipment UE, system information (SI) sent by a master eNodeB MeNB, where the SI includes a system frame number SFN of at least one eNodeB eNB adjacent to the MeNB, or indication information used to indicate whether a system frame number SFN of each eNB and an SFN of the MeNB have same parity. The method also includes receiving, by the UE, radio resource control RRC connection reconfiguration signaling sent by the MeNB, where the RRC connection reconfiguration signaling is used to instruct the UE to use one eNB in the at least one eNodeB eNB as a secondary eNodeB SeNB of the UE, and execute primary secondary cell pSCell configuration at the SeNB. The method also includes selecting, by the UE, a radio frame and a radio subframe from physical random access channel PRACH configuration according to the received indication information or the SFN of the SeNB, to perform random access to the SeNB.

With reference to the third aspect, in a first possible implementation manner, when the SI includes the indication information, the selecting, by the UE, a radio frame and a radio subframe from physical random access channel PRACH configuration according to the received indication information, to perform random access to the SeNB specifically includes: determining, by the UE, whether the SFN of the SeNB is an odd number or an even number according to the received indication information and the SFN of the MeNB; and if the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

With reference to the third aspect, in a second possible implementation manner, when the SI includes the SFN of the SeNB, the selecting, by the UE, a radio frame and a radio subframe from physical random access channel PRACH configuration according to the SFN of the SeNB, to perform random access to the SeNB specifically includes: if the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

According to a fourth aspect, an embodiment of the present invention provides a method for configuring a serving cell in dual connectivity. The method includes: sending, by a master eNodeB MeNB, system information SI to user equipment UE, where the SI includes a system frame number SFN of at least one eNodeB eNB adjacent to the MeNB, or indication information used to indicate whether a system frame number SFN of each eNB and an SFN of the MeNB have same parity. The method also includes sending, by the MeNB, radio resource control RRC connection reconfiguration signaling to the UE, where the RRC connection reconfiguration signaling is used to instruct the UE to use one eNB in the at least one eNodeB eNB as a secondary eNodeB SeNB of the UE, and execute primary secondary cell pSCell configuration at the SeNB. The method also includes enabling, by the MeNB, the UE to select a radio frame and a radio subframe from physical random access channel PRACH configuration according to the received indication information or the SFN of the SeNB, to perform random access to the SeNB.

According to a fifth aspect, an embodiment of the present invention provides user equipment. The user equipment includes: a receiving unit, configured to receive radio resource control RRC connection reconfiguration signaling sent by a master eNodeB MeNB, where the RRC connection reconfiguration signaling is used to instruct the user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity. The user equipment also includes a processing unit, configured to select a radio frame and a radio subframe from physical random access channel PRACH configuration according to the received indication information or the SFN of the SeNB, to perform random access to the SeNB.

With reference to the fifth aspect, in a first possible implementation manner, the processing unit is further configured to: when the RRC connection reconfiguration signaling includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

With reference to the fifth aspect, in a second possible implementation manner, the processing unit is further configured to: when the RRC connection reconfiguration signaling includes the SFN of the SeNB, if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to a sixth aspect, an embodiment of the present invention provides a base station. The base station includes: a processing unit, configured to determine radio resource control RRC connection reconfiguration signaling, where the RRC connection reconfiguration signaling is used to instruct user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity. The base station also includes a sending unit, configured to send the RRC connection reconfiguration signaling to the user equipment.

According to a seventh aspect, an embodiment of the present invention provides user equipment. The user equipment includes: a receiving unit, configured to receive system information SI sent by a master eNodeB MeNB, where the SI includes a system frame number SFN of at least one eNodeB eNB adjacent to the MeNB, or indication information used to indicate whether a system frame number SFN of each eNB and an SFN of the MeNB have same parity. The receiving unit is further configured to receive radio resource control RRC connection reconfiguration signaling sent by the MeNB, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB. The user equipment also includes processing unit, configured to select a radio frame and a radio subframe from physical random access channel PRACH configuration according to the received indication information or the SFN of the SeNB, to perform random access to the SeNB.

With reference to the seventh aspect, in a first possible implementation manner, the processing unit is further configured to: when the SI includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

With reference to the seventh aspect, in a second possible implementation manner, the processing unit is further configured to: when the SI includes the SFN of the SeNB, if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to an eighth aspect, an embodiment of the present invention provides a base station. The base station includes: a sending unit, configured to send system information SI to user equipment, where the SI includes a system frame number SFN of at least one eNodeB eNB adjacent to the eNodeB, or indication information used to indicate whether a system frame number SFN of each eNB and an SFN of the MeNB have same parity. The sending unit is further configured to send radio resource control RRC connection reconfiguration signaling to the user equipment, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB. The base station also includes a processing unit, configured to enable the user equipment to select a radio frame and a radio subframe from physical random access channel PRACH configuration according to the received indication information or the SFN of the SeNB, to perform random access to the SeNB.

According to a ninth aspect, an embodiment of the present invention provides user equipment. The user equipment includes: a communications interface, a memory, and a processor; the communications interface is configured to communicate with a network element; the memory is configured to store computer code. The processor executing the computer code is configured to: receive radio resource control RRC connection reconfiguration signaling sent by a master eNodeB MeNB, where the RRC connection reconfiguration signaling is used to instruct the user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity; and select a radio frame and a radio subframe from physical random access channel PRACH configuration according to the received indication information or the SFN of the SeNB, to perform random access to the SeNB.

With reference to the ninth aspect, in a first possible implementation manner, the processor executing the computer code is further configured to: when the RRC connection reconfiguration signaling includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

With reference to the ninth aspect, in a second possible implementation manner, the processor executing the computer code is further configured to: when the RRC connection reconfiguration signaling includes the SFN of the SeNB, if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to a tenth aspect, an embodiment of the present invention provides a base station. The base station includes: a communications interface, a memory, and a processor; the communications interface is configured to communicate with a network element; the memory is configured to store computer code; and the processor executing the computer code is configured to: determine radio resource control RRC connection reconfiguration signaling, where the RRC connection reconfiguration signaling is used to instruct user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity; and send the RRC connection reconfiguration signaling to the user equipment.

According to an eleventh aspect, an embodiment of the present invention provides user equipment, where the user equipment includes: a communications interface, a memory, and a processor; the communications interface is configured to communicate with a network element; the memory is configured to store computer code; and the processor executing the computer code is configured to: receive system information SI sent by a master eNodeB MeNB, where the SI includes a system frame number SFN of at least one eNodeB eNB adjacent to the MeNB, or indication information used to indicate whether a system frame number SFN of each eNB and an SFN of the MeNB have same parity; receive radio resource control RRC connection reconfiguration signaling sent by the MeNB, where the RRC connection reconfiguration signaling is used to instruct the user equipment to use one eNB in the at least one eNodeB eNB as a secondary eNodeB SeNB of the UE, and execute primary secondary cell pSCell configuration at the SeNB; and select a radio frame and a radio subframe from physical random access channel PRACH configuration according to the received indication information or the SFN of the SeNB, to perform random access to the SeNB.

With reference to the eleventh aspect, in a first possible implementation manner, the processor executing the computer code is further configured to: when the SI includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

With reference to the eleventh aspect, in a second possible implementation manner, the processor executing the computer code is further configured to: when the SI includes the SFN of the SeNB, if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to a twelfth aspect, an embodiment of the present invention provides a base station, where the base station includes: a communications interface, a memory, and a processor; the communications interface is configured to communicate with a network element; the memory is configured to store computer code; and the processor executing the computer code is configured to: send system information SI to user equipment, where the SI includes a system frame number SFN of at least one eNodeB eNB adjacent to the MeNB, or indication information used to indicate whether a system frame number SFN of each eNB and an SFN of the MeNB have same parity; send radio resource control RRC connection reconfiguration signaling to the user equipment, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB; and enable the UE to select a radio frame and a radio subframe from physical random access channel PRACH configuration according to the received indication information or the SFN of the SeNB, to perform random access to the SeNB.

According to the method for configuring a serving cell in dual connectivity, the user equipment, and the base station that are provided in the embodiments of the present invention, a master eNodeB MeNB sends system information SI to UE, where the system information SI carries indication information used to indicate whether an SFN of the MeNB and SFNs of multiple adjacent eNBs (one of the eNBs is used as an SeNB of the UE) have same parity, or carries SFNs of multiple adjacent eNBs; or the master eNodeB MeNB sends RRC connection reconfiguration signaling to the UE, where the RRC connection reconfiguration signaling carries indication information used to indicate whether an SFN of the MeNB and an SFN of the SeNB have same parity, or carries an SFN of the SeNB. The UE executes primary secondary cell pSCell configuration at the secondary eNodeB SeNB according to the RRC connection reconfiguration signaling; the UE may determine parity of the SFN of the SeNB according to the received indication information or the SFN of the SeNB, so that the UE performs random access to the SeNB according to physical random access channel PRACH configuration, so as to complete the pSCell configuration. Therefore, when performing the random access to the SeNB, the UE may determine parity of the SFN of the SeNB without a need of reading a PBCH of the SeNB, thereby reducing a time for completing the pSCell configuration.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Before the technical solutions provided in the embodiments of the present invention are described, it should be noted that persons skilled in the art may clearly know in the following solutions provided in the embodiments of the present invention, UE has established a connection to a master eNodeB MeNB, and the UE has obtained an SFN of the MeNB in an interaction process of establishing the connection to the MeNB. A process of obtaining the SFN of the MeNB by the UE is not described herein, and persons skilled in the art may refer to a related prior art. In addition, it should be noted that in the following solutions provided in the embodiments of the present invention, a process in which the UE selects, according to PRACH configuration, a radio frame corresponding to a case in which the SFN of the SeNB is an even number and a corresponding radio subframe, to perform random access to the SeNB is the prior art, and persons skilled in the art may refer to a related prior art.

Figure 1:
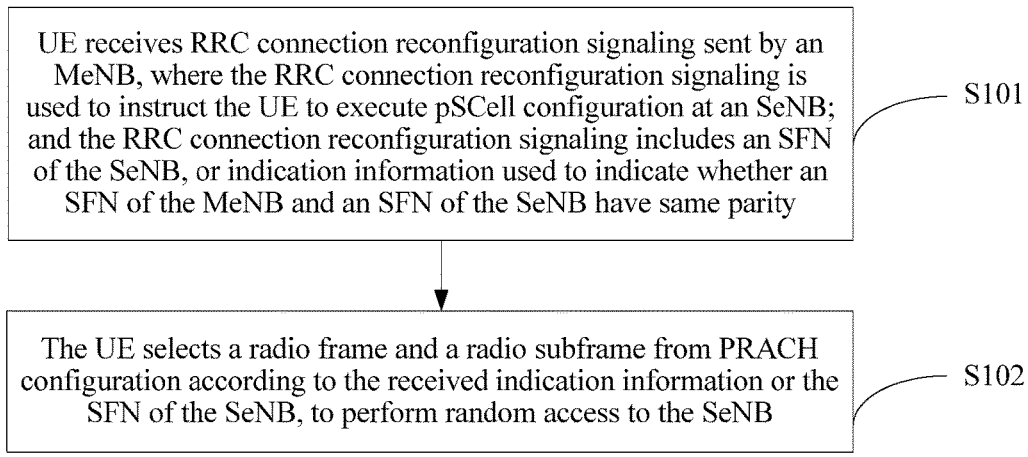
FIG. 1 is a schematic flowchart 1 of a method for configuring a serving cell in dual connectivity according to an embodiment of the present invention.

A method for configuring a serving cell in dual connectivity provided in an embodiment of the present invention is based on a UE side. As shown in FIG. 1, the method includes the following steps.

S101. UE receives RRC connection reconfiguration signaling sent by an MeNB, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity.

S102. The UE selects a radio frame and a radio subframe from PRACH configuration according to the received indication information or the SFN of the SeNB, to perform random access to the SeNB.

According to the method for configuring a serving cell in dual connectivity provided in this embodiment of the present invention, UE receives RRC connection reconfiguration signaling sent by an MeNB, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 2:
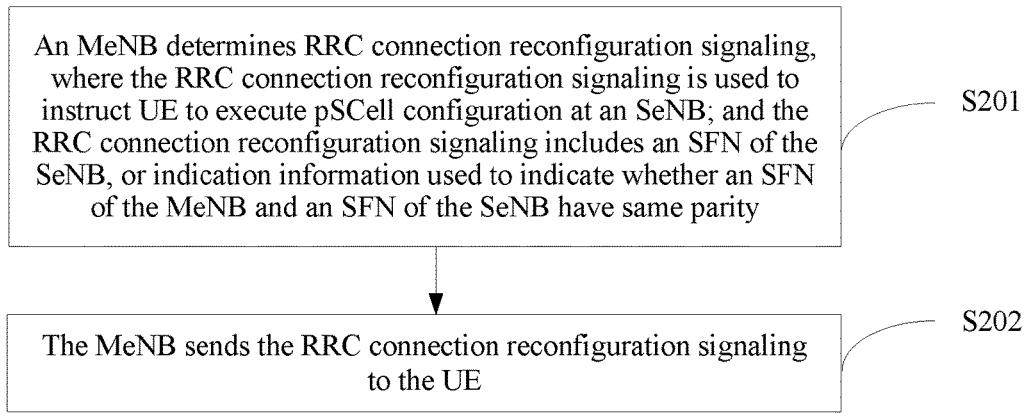
FIG. 2 is a schematic flowchart 2 of a method for configuring a serving cell in dual connectivity according to an embodiment of the present invention.

A method for configuring a serving cell in dual connectivity provided in an embodiment of the present invention is based on a base station side. As shown in FIG. 2, the method includes the following steps.

S201. An MeNB determines RRC connection reconfiguration signaling, where the RRC connection reconfiguration signaling is used to instruct UE to execute pSCell configuration at an SeNB; and the RRC connection reconfiguration signaling includes an SFN of the SeNB, or indication information used to indicate whether an SFN of the MeNB and an SFN of the SeNB have same parity.

S202. The MeNB sends the RRC connection reconfiguration signaling to the UE.

According to the method for configuring a serving cell in dual connectivity provided in this embodiment of the present invention, first, an MeNB determines RRC connection reconfiguration signaling, where the RRC connection reconfiguration signaling is used to instruct UE to execute pSCell configuration at an SeNB; and the RRC connection reconfiguration signaling includes an SFN of the SeNB, or indication information used to indicate whether an SFN of the MeNB and an SFN of the SeNB have same parity. Then the MeNB sends the RRC connection reconfiguration signaling to the UE, and then the UE completes the pSCell configuration at the SeNB according to the RRC connection reconfiguration signaling. Therefore, when performing the random access to the SeNB, the UE may determine parity of the SFN of the SeNB without a need of reading a PBCH of the SeNB, thereby reducing a time for completing the pSCell configuration.

Figure 3A:
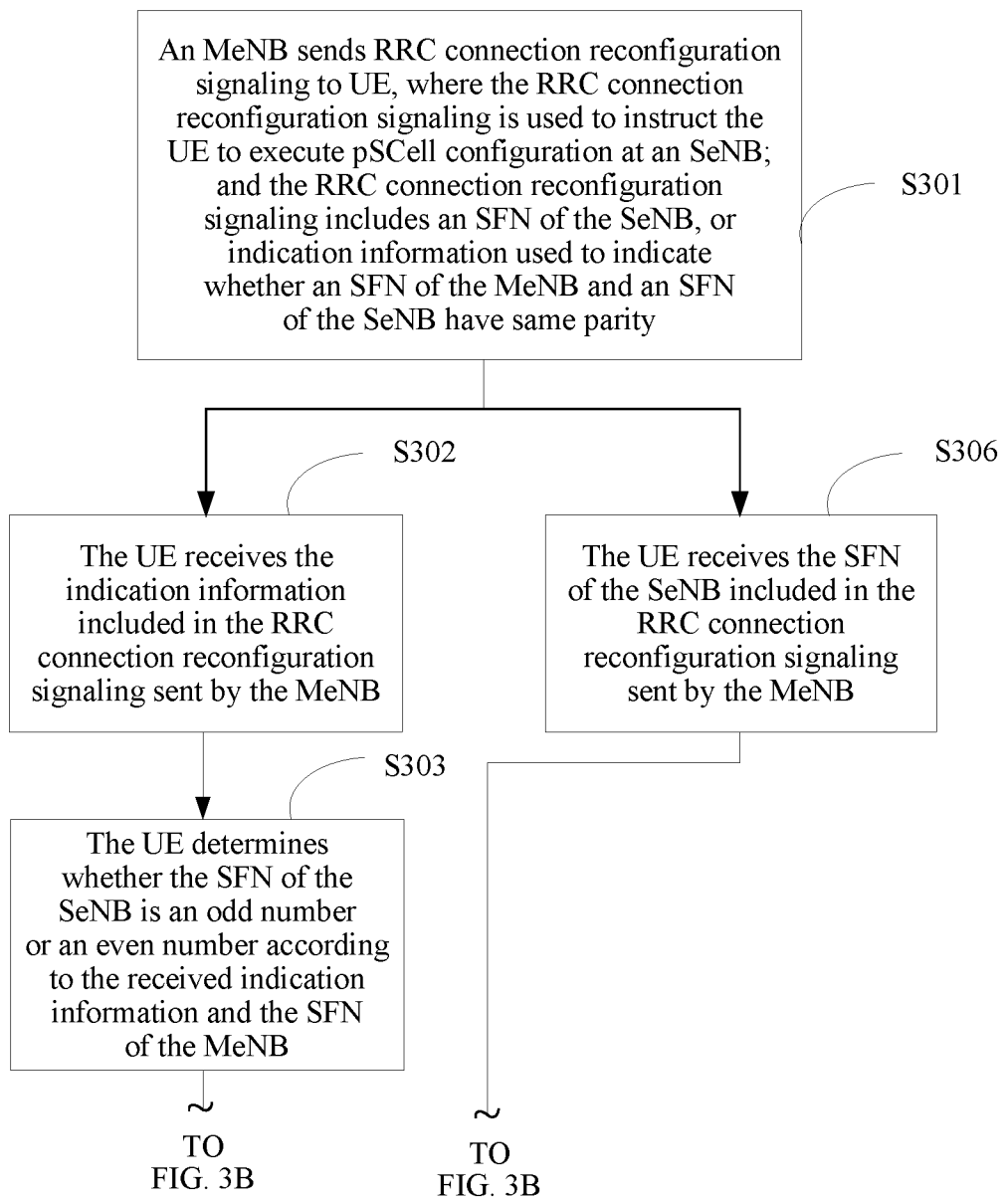
FIG. 3A and FIG. 3B are a schematic flowchart 3 of a method for configuring a serving cell in dual connectivity according to an embodiment of the present invention.
Figure 3B:
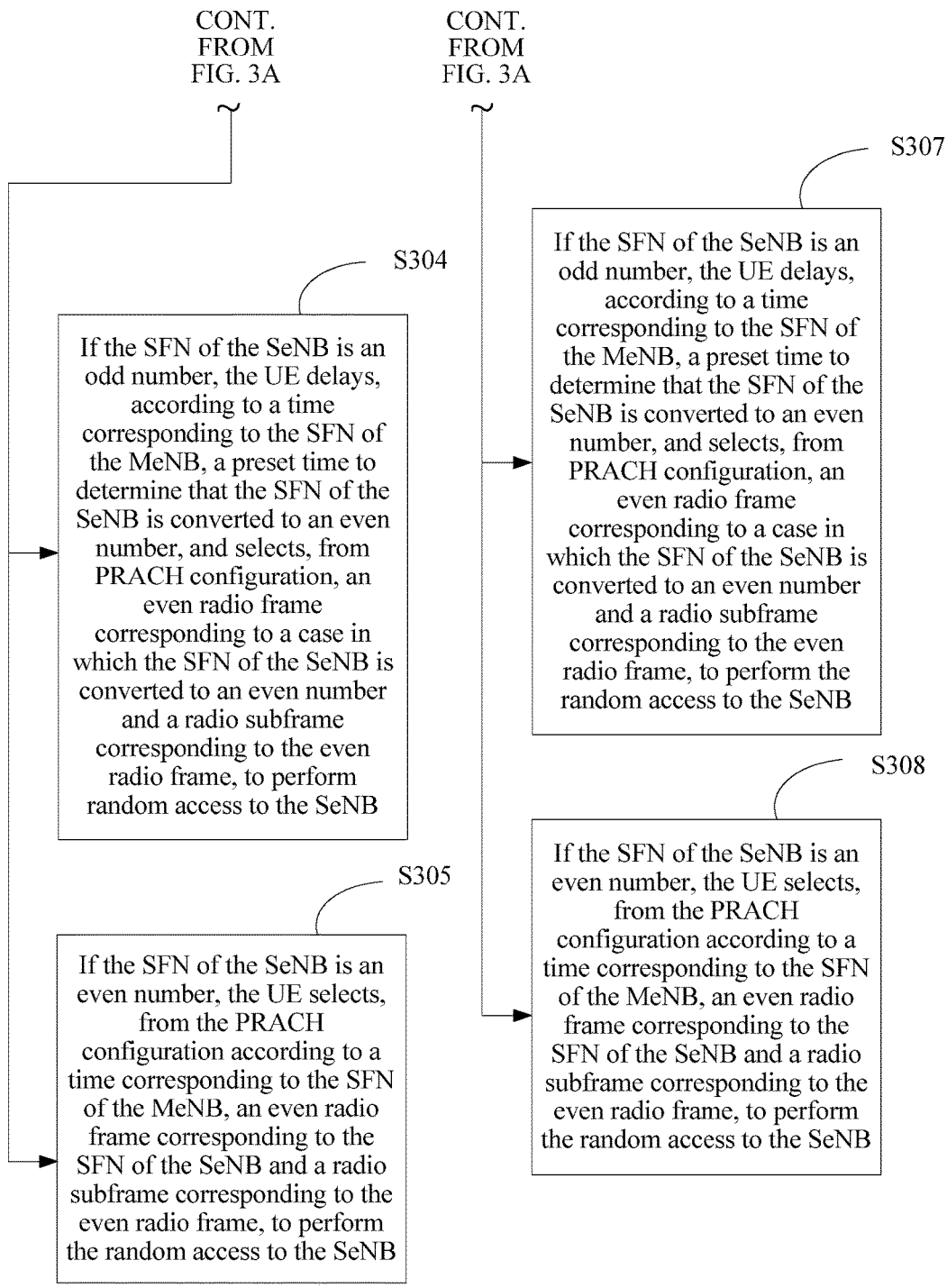

To make persons skilled in the art more clearly understand the technical solutions provided in the embodiments of the present invention, the following describes in detail, by using a specific embodiment, a method for configuring a serving cell in dual connectivity provided in an embodiment of the present invention. As shown in FIG. 3A and FIG. 3B, the method includes the following steps.

S301. An MeNB sends RRC connection reconfiguration signaling to UE, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity.

For example, the MeNB may send one bit in the RRC connection reconfiguration signaling to the UE, and the bit is used to indicate whether SFNs of the MeNB and the SeNB have same parity. For example, 0: indicating that the SFNs of the MeNB and the SeNB have different parity; and 1: indicating that the SFNs of the MeNB and the SeNB have the same parity.

If the RRC connection reconfiguration signaling includes the indication information used to indicate whether an SFN of the MeNB and an SFN of the SeNB have same parity, S302, S303, and S304 or S305 are executed.

S302. The UE receives the indication information included in the RRC connection reconfiguration signaling sent by the MeNB.

S303. The UE determines whether the SFN of the SeNB is an odd number or an even number according to the received indication information and the SFN of the MeNB.

For example, if a bit value of the one bit received by the UE is 0, it may be determined that the SFNs of the MeNB and the SeNB have different parity at a same moment; and if the SFN, of the MeNB, obtained by the UE at the moment is an odd number, it may be determined that the SFN of the SeNB is an even number. For another example, if a bit value of the one bit received by the UE is 1, it may be determined that the SFNs of the MeNB and the SeNB have same parity at a same moment; and if the SFN, of the MeNB, obtained by the UE at the moment is an odd number, it may be determined that the SFN of the SeNB is an odd number.

S304. If the SFN of the SeNB is an odd number, the UE delays, according to a time corresponding to the SFN of the MeNB, a preset time to determine that the SFN of the SeNB is converted to an even number, and selects, from PRACH configuration, an even radio frame corresponding to a case in which the SFN of the SeNB is converted to an even number and a radio subframe corresponding to the even radio frame, to perform random access to the SeNB.

For example, the preset time may be 10 ms, that is, duration of one radio frame, and for ease of description by using an example, a part of the PRACH configuration is captured as follows:

| PRACH configuration Index / PRACH configuration index | Preamble format / Preamble format | System frame number / System frame number | Subframe number / Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |

Note:
In the table, Even indicates only an even number and Any indicates either an odd number or an even number.

When the SFN of the SeNB is an odd number, the UE delays, according to the current time corresponding to the SFN of the MeNB, 10 ms to wait until the SFN of the SeNB is converted to an even number; and then, assuming that configuration whose index number is 1 is selected from the PRACH configuration, a radio subframe, of the even SFN, whose subframe number is 4 needs to be selected, to perform the random access to the SeNB.

It should be noted that, a value range of the SFN is 0-1023, and in practice, an SFN of a radio frame is a cycle of 0-1023, that is, a system frame number SFN of a next radio frame of a radio frame whose system frame number SFN is 1023 is 0. Duration of one radio frame is 10 ms, and therefore, parity of an SFN of a radio frame is converted once every 10 ms. The preset time is not limited in the technical solutions provided in this embodiment.

S305. If the SFN of the SeNB is an even number, the UE selects, from the PRACH configuration according to a time corresponding to the SFN of the MeNB, an even radio frame corresponding to the SFN of the SeNB and a radio subframe corresponding to the even radio frame, to perform the random access to the SeNB.

For example, when the SFN of the SeNB is an even number, it is assumed that the UE selects, from the PRACH configuration, configuration whose index number is 2, and a radio subframe, of the even SFN, whose subframe number is 7 needs to be selected, to perform the random access to the SeNB.

If the RRC connection reconfiguration signaling includes the SFN of the SeNB, S306, and S307 or S308 are executed.

S306. The UE receives the SFN of the SeNB included in the RRC connection reconfiguration signaling sent by the MeNB.

For example, the MeNB and the SeNB are connected by using an X2 interface, and therefore, the MeNB may obtain the SFN of the SeNB by means of interaction, and the MeNB may send the SFN of the SeNB to the UE by using the RRC connection reconfiguration signaling.

S307. If the SFN of the SeNB is an odd number, the UE delays, according to a time corresponding to the SFN of the MeNB, a preset time to determine that the SFN of the SeNB is converted to an even number, and selects, from PRACH configuration, an even radio frame corresponding to a case in which the SFN of the SeNB is converted to an even number and a radio subframe corresponding to the even radio frame, to perform random access to the SeNB.

For example, the preset time may be 10 ms. When the SFN of the SeNB is an odd number, the UE delays, according to the current time corresponding to the SFN of the MeNB, 10 ms to wait until the SFN of the SeNB is converted to an even number; and then, assuming that configuration whose index number is 0 is selected from the PRACH configuration, a radio subframe, of the even SFN, whose subframe number is 1 needs to be selected, to perform the random access to the SeNB.

S308. If the SFN of the SeNB is an even number, the UE selects, from the PRACH configuration according to a time corresponding to the SFN of the MeNB, an even radio frame corresponding to the SFN of the SeNB and a radio subframe corresponding to the even radio frame, to perform the random access to the SeNB.

For example, when the SFN of the SeNB is an even number, it is assumed that the UE selects, from the PRACH configuration, configuration whose index number is 2, and a radio subframe, of the even SFN, whose subframe number is 7 needs to be selected, to perform the random access to the SeNB.

According to the method for configuring a serving cell in dual connectivity provided in this embodiment of the present invention, an MeNB sends RRC connection reconfiguration signaling to UE, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 4:
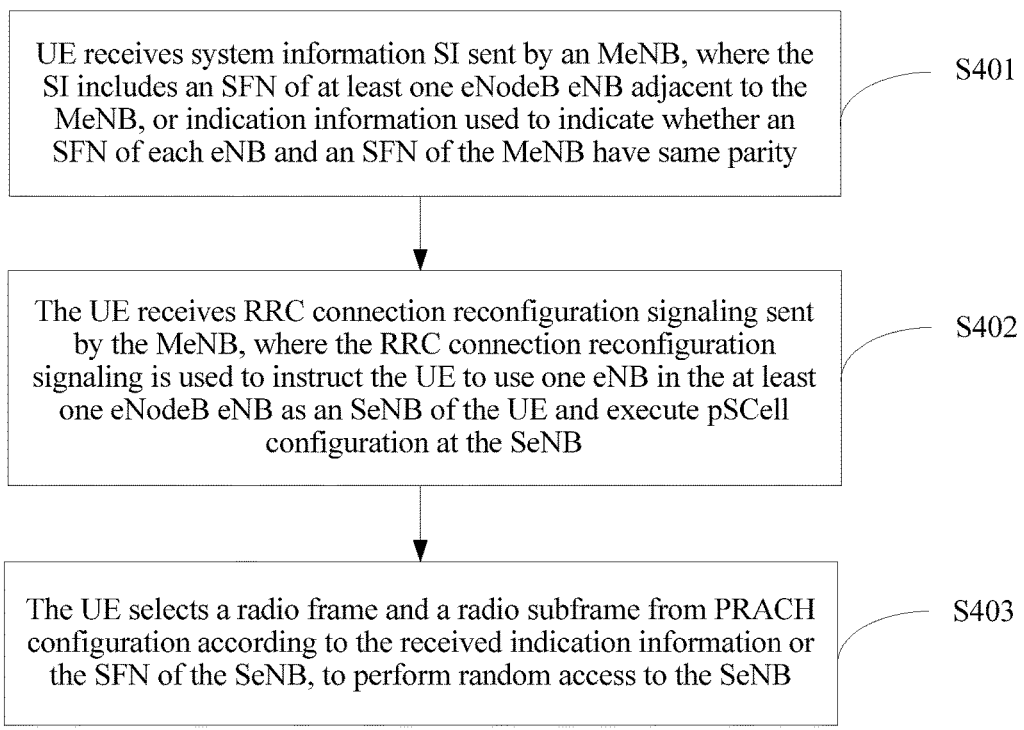
FIG. 4 is a schematic flowchart 4 of a method for configuring a serving cell in dual connectivity according to an embodiment of the present invention.

A method for configuring a serving cell in dual connectivity further provided in an embodiment of the present invention is based on a UE side. As shown in FIG. 4, the method includes the following steps.

S401. UE receives system information SI sent by an MeNB, where the SI includes an SFN of at least one eNodeB eNB adjacent to the MeNB, or indication information used to indicate whether an SFN of each eNB and an SFN of the MeNB have same parity.

S402. The UE receives RRC connection reconfiguration signaling sent by the MeNB, where the RRC connection reconfiguration signaling is used to instruct the UE to use one eNB in the at least one eNodeB eNB as an SeNB of the UE and execute pSCell configuration at the SeNB.

S403. The UE selects a radio frame and a radio subframe from PRACH configuration according to the received indication information or the SFN of the SeNB, to perform random access to the SeNB.

According to the method for configuring a serving cell in dual connectivity provided in this embodiment of the present invention, UE receives system information SI sent by an MeNB, where the SI includes an SFN of at least one eNodeB eNB adjacent to the MeNB, or indication information used to indicate whether an SFN of each eNB and an SFN of the MeNB have same parity. The UE receives RRC connection reconfiguration signaling sent by the MeNB, where the RRC connection reconfiguration signaling is used to instruct the UE to use one eNB in the at least one eNodeB eNB as an SeNB of the UE and execute pSCell configuration at the SeNB. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 5:
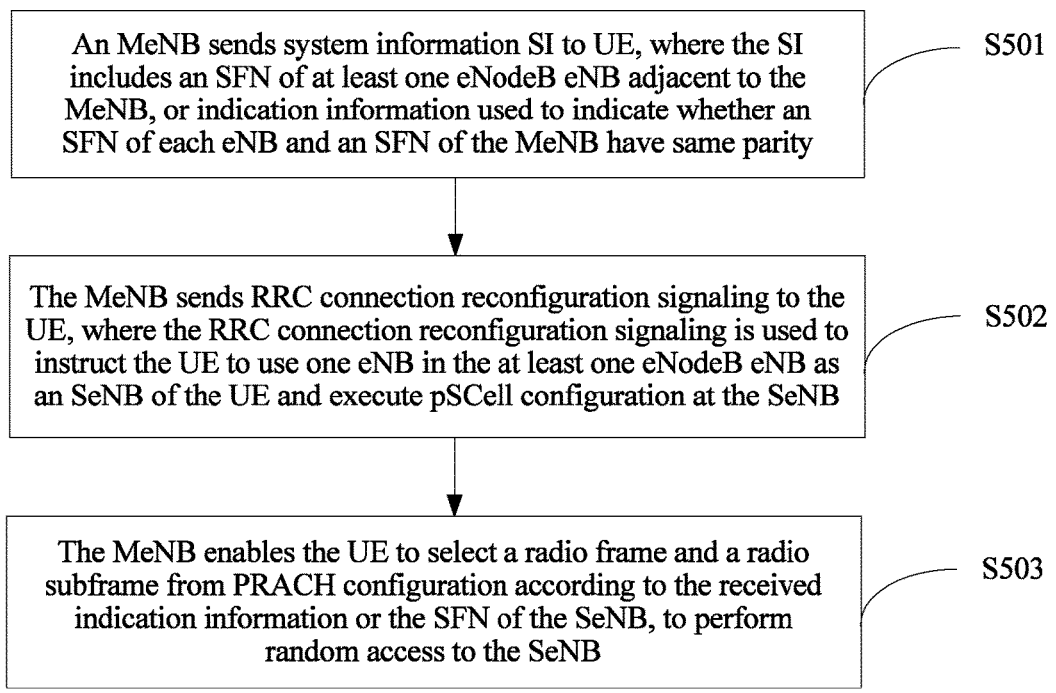
FIG. 5 is a schematic flowchart 5 of a method for configuring a serving cell in dual connectivity according to an embodiment of the present invention.

A method for configuring a serving cell in dual connectivity further provided in an embodiment of the present invention is based on a base station side. As shown in FIG. 5, the method includes the following steps.

S501. An MeNB sends system information SI to UE, where the SI includes an SFN of at least one eNodeB eNB adjacent to the MeNB, or indication information used to indicate whether an SFN of each eNB and an SFN of the MeNB have same parity.

S502. The MeNB sends RRC connection reconfiguration signaling to the UE, where the RRC connection reconfiguration signaling is used to instruct the UE to use one eNB in the at least one eNodeB eNB as an SeNB of the UE and execute pSCell configuration at the SeNB.

S503. The MeNB enables the UE to select a radio frame and a radio subframe from PRACH configuration according to the received indication information or the SFN of the SeNB, to perform random access to the SeNB.

According to the method for configuring a serving cell in dual connectivity provided in this embodiment of the present invention, an MeNB sends system information SI to UE, where the SI includes an SFN of at least one eNodeB eNB adjacent to the MeNB, or indication information used to indicate whether an SFN of each eNB and an SFN of the MeNB have same parity; the MeNB sends RRC connection reconfiguration signaling to the UE, where the RRC connection reconfiguration signaling is used to instruct the UE to use one eNB in the at least one eNodeB eNB as an SeNB of the UE and execute pSCell configuration at the SeNB; and the MeNB enables the UE to select a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 6A:
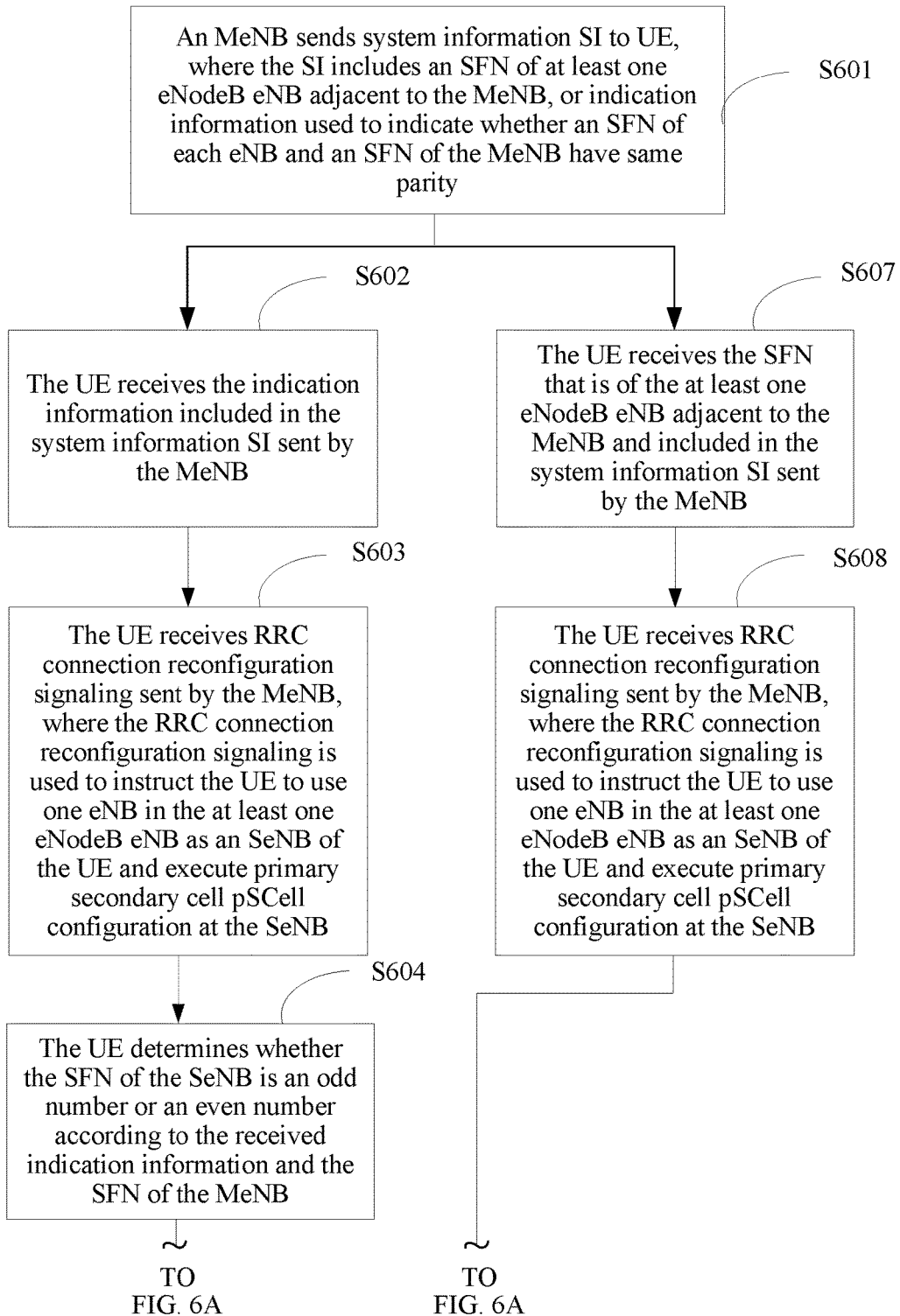
FIG. 6A and FIG. 6B are a schematic flowchart 6 of a method for configuring a serving cell in dual connectivity according to an embodiment of the present invention.
Figure 6B:
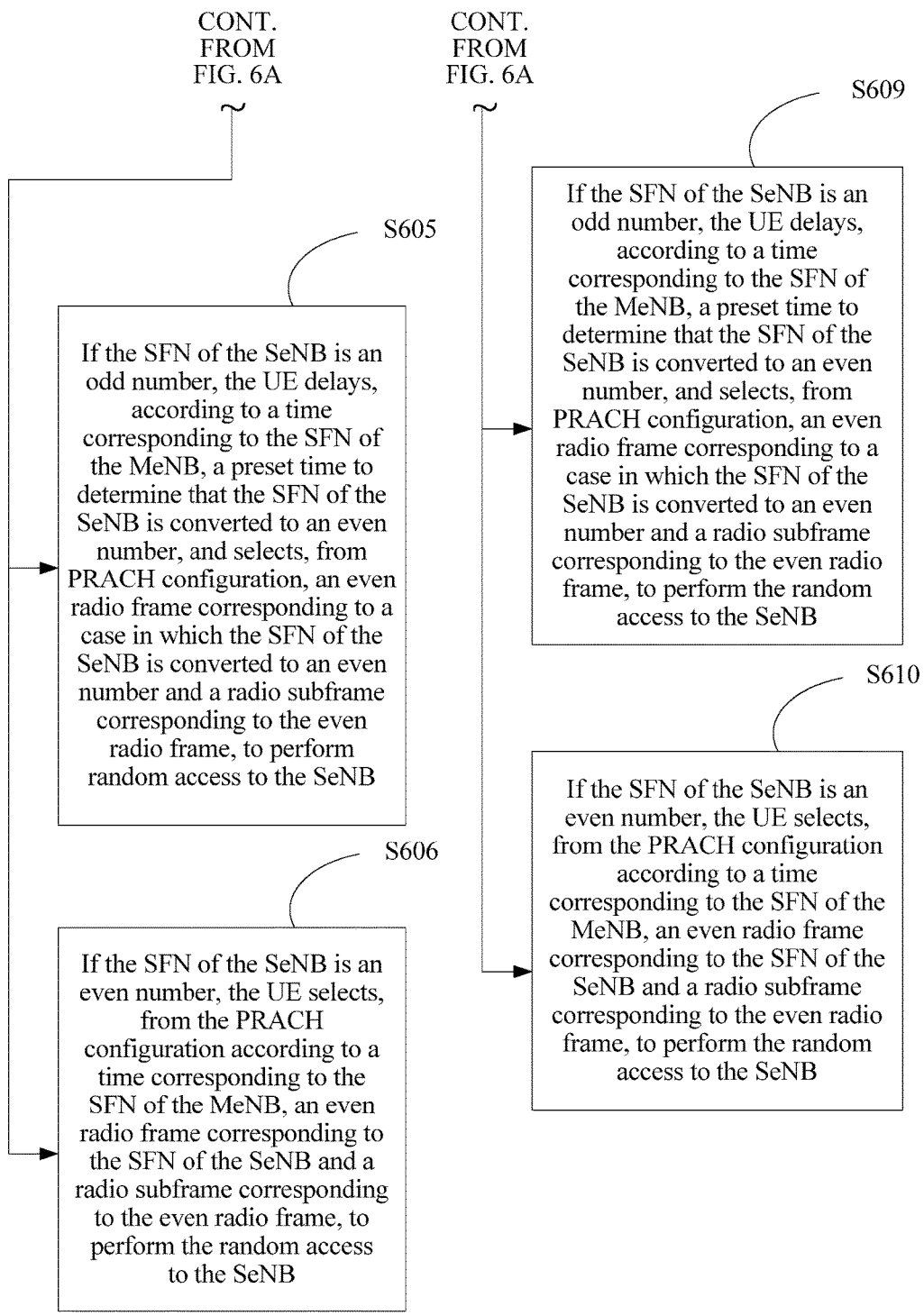

To make persons skilled in the art more clearly understand the technical solutions provided in the embodiments of the present invention, the following describes in detail, by using a specific embodiment, a method for configuring a serving cell in dual connectivity further provided in an embodiment of the present invention. As shown in FIG. 6A and FIG. 6B, the method includes the following steps.

S601. An MeNB sends system information SI to UE, where the SI includes an SFN of at least one eNodeB eNB adjacent to the MeNB, or indication information used to indicate whether an SFN of each eNB and an SFN of the MeNB have same parity.

For example, one bit may be used to indicate whether SFNs of the MeNB and an adjacent eNB have same parity. For example, 0: indicating that the SFNs of the MeNB and the SeNB have different parity; and 1: indicating that the SFNs of the MeNB and the SeNB have the same parity.

Indication information includes at least one foregoing bit, and the MeNB may add the indication information to the system information SI during system information broadcast (System Information Broadcast) to send the indication information to the UE.

If the system information SI includes the indication information used to indicate whether an SFN of the at least one eNodeB eNB adjacent to the MeNB and an SFN of the MeNB have same parity, S602, S603, S604, and S605 or S606 are executed.

S602. The UE receives the indication information included in the system information SI sent by the MeNB.

S603. The UE receives RRC connection reconfiguration signaling sent by the MeNB, where the RRC connection reconfiguration signaling is used to instruct the UE to use one eNB in the at least one eNodeB eNB as an SeNB of the UE and execute primary secondary cell pSCell configuration at the SeNB.

For example, the UE receives the RRC connection reconfiguration signaling sent by the MeNB, determines an SeNB of the UE according to the RRC connection reconfiguration signaling and from the multiple eNBs adjacent to the MeNB, and starts to execute the pSCell configuration at the SeNB.

S604. The UE determines whether the SFN of the SeNB is an odd number or an even number according to the received indication information and the SFN of the MeNB.

For example, the UE has determined, from the multiple eNBs adjacent to the MeNB, the SeNB of the UE. For example, if a bit value of one bit received by the UE and corresponding to the SeNB is 0, it may be determined that the SFNs of the MeNB and the SeNB have different parity at a same moment; and if the SFN, of the MeNB, obtained by the UE at the moment is an odd number, it may be determined that the SFN of the SeNB is an even number. For another example, if a bit value of the one bit received by the UE is 1, it may be determined that the SFNs of the MeNB and the SeNB have same parity at a same moment; and if the SFN, of the MeNB, obtained by the UE at the moment is an odd number, it may be determined that the SFN of the SeNB is an odd number.

S605. If the SFN of the SeNB is an odd number, the UE delays, according to a time corresponding to the SFN of the MeNB, a preset time to determine that the SFN of the SeNB is converted to an even number, and selects, from PRACH configuration, an even radio frame corresponding to a case in which the SFN of the SeNB is converted to an even number and a radio subframe corresponding to the even radio frame, to perform random access to the SeNB.

For example, when the SFN of the SeNB is an odd number, the UE delays, according to the time corresponding to the SFN of the MeNB, 10 ms to wait until the SFN of the SeNB is converted to an even number; and then, assuming that configuration whose index number is 1 is selected from the PRACH configuration, a radio subframe, of the even SFN, whose subframe number is 4 needs to be selected, to perform the random access to the SeNB.

S606. If the SFN of the SeNB is an even number, the UE selects, from the PRACH configuration according to a time corresponding to the SFN of the MeNB, an even radio frame corresponding to the SFN of the SeNB and a radio subframe corresponding to the even radio frame, to perform the random access to the SeNB.

For example, when the SFN of the SeNB is an even number, it is assumed that the UE selects, from the PRACH configuration, configuration whose index number is 2, and a radio subframe, of the even SFN, whose subframe number is 7 needs to be selected, to perform the random access to the SeNB.

If the system information SI includes the system frame number SFN of the at least one eNodeB eNB adjacent to the MeNB, S607, S608, and S609 or S610 are executed.

S607. The UE receives the SFN that is of the at least one eNodeB eNB adjacent to the MeNB and included in the system information SI sent by the MeNB.

For example, the MeNB and each adjacent eNB are connected by using an X2 interface, and therefore, the MeNB may obtain the SFN of each adjacent eNB by means of interaction, and the MeNB may send the SFN of each adjacent eNB to the UE by using the system information SI.

S608. The UE receives RRC connection reconfiguration signaling sent by the MeNB, where the RRC connection reconfiguration signaling is used to instruct the UE to use one eNB in the at least one eNodeB eNB as an SeNB of the UE and execute pSCell configuration at the SeNB.

For example, the UE receives the RRC connection reconfiguration signaling sent by the MeNB, determines an SeNB of the UE according to the RRC connection reconfiguration signaling and from the multiple eNBs adjacent to the MeNB, and starts to execute the pSCell configuration at the SeNB.

S609. If the SFN of the SeNB is an odd number, the UE delays, according to a time corresponding to the SFN of the MeNB, a preset time to determine that the SFN of the SeNB is converted to an even number, and selects, from PRACH configuration, an even radio frame corresponding to a case in which the SFN of the SeNB is converted to an even number and a radio subframe corresponding to the even radio frame, to perform random access to the SeNB.

For example, when the SFN of the SeNB is an odd number, the UE delays, according to the time corresponding to the SFN of the MeNB, 10 ms to wait until the SFN of the SeNB is converted to an even number; and then, assuming that configuration whose index number is 1 is selected from the PRACH configuration, a radio subframe, of the even SFN, whose subframe number is 4 needs to be selected, to perform the random access to the SeNB.

S610. If the SFN of the SeNB is an even number, the UE selects, from the PRACH configuration according to a time corresponding to the SFN of the MeNB, an even radio frame corresponding to the SFN of the SeNB and a radio subframe corresponding to the even radio frame, to perform the random access to the SeNB.

For example, when the SFN of the SeNB is an even number, it is assumed that the UE selects, from the PRACH configuration, configuration whose index number is 2, and a radio subframe, of the even SFN, whose subframe number is 7 needs to be selected, to perform the random access to the SeNB.

According to the method for configuring a serving cell in dual connectivity provided in this embodiment of the present invention, an MeNB sends system information SI to UE, where the SI includes an SFN of at least one eNodeB eNB adjacent to the MeNB, or indication information used to indicate whether an SFN of each eNB and an SFN of the MeNB have same parity; the MeNB sends RRC connection reconfiguration signaling to the UE, where the RRC connection reconfiguration signaling is used to instruct the UE to use one eNB in the at least one eNodeB eNB as an SeNB of the UE and execute pSCell configuration at the SeNB. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 7:
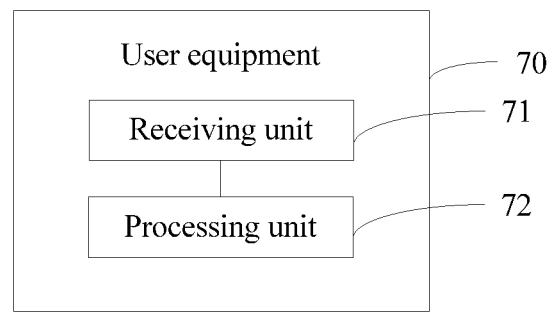
FIG. 7 is a schematic structural diagram 1 of user equipment according to an embodiment of the present invention.

An embodiment of the present invention provides user equipment 70. As shown in FIG. 7, the user equipment 70 includes: a receiving unit 71, configured to receive radio resource control RRC connection reconfiguration signaling sent by a master eNodeB MeNB, where the RRC connection reconfiguration signaling is used to instruct the user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity; and a processing unit 72, configured to select a radio frame and a radio subframe from physical random access channel PRACH configuration according to the received indication information or the SFN of the SeNB, to perform random access to the SeNB.

Optionally, the processing unit 72 is further configured to: when the RRC connection reconfiguration signaling includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

Optionally, the processing unit 72 is further configured to: when the RRC connection reconfiguration signaling includes the SFN of the SeNB, if the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to the user equipment (UE) provided in this embodiment of the present invention, the UE receives RRC connection reconfiguration signaling sent by an MeNB, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 8:
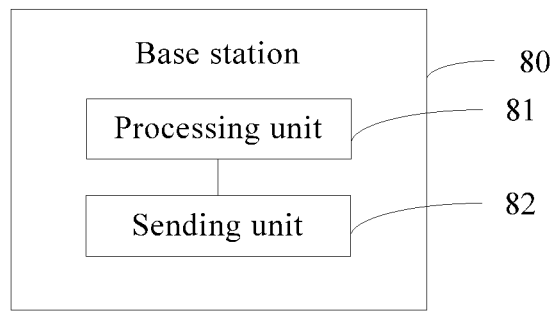
FIG. 8 is a schematic structural diagram 1 of a base station according to an embodiment of the present invention.

An embodiment of the present invention provides a base station 80. As shown in FIG. 8, the base station 80 includes: a processing unit 81, configured to determine radio resource control RRC connection reconfiguration signaling, where the RRC connection reconfiguration signaling is used to instruct user equipment to execute primary secondary cell pSCell configuration at a secondary eNodeB SeNB; and the RRC connection reconfiguration signaling includes an SFN of the SeNB, or indication information used to indicate whether a system frame number SFN of an MeNB and an SFN of the SeNB have same parity; and a sending unit 82, configured to send the RRC connection reconfiguration signaling to the user equipment.

According to the base station provided in this embodiment of the present invention, first, an eNodeB determines RRC connection reconfiguration signaling, where the RRC connection reconfiguration signaling is used to instruct UE to execute pSCell configuration at an SeNB; and the RRC connection reconfiguration signaling includes an SFN of the SeNB, or indication information used to indicate whether an SFN of the MeNB and an SFN of the SeNB have same parity. Then the eNodeB sends the RRC connection reconfiguration signaling to the UE, and then the UE completes the pSCell configuration at the SeNB according to the RRC connection reconfiguration signaling. Therefore, when performing the random access to the SeNB, the UE may determine parity of the SFN of the SeNB without a need of reading a PBCH of the SeNB, thereby reducing a time for completing the pSCell configuration.

Figure 9:
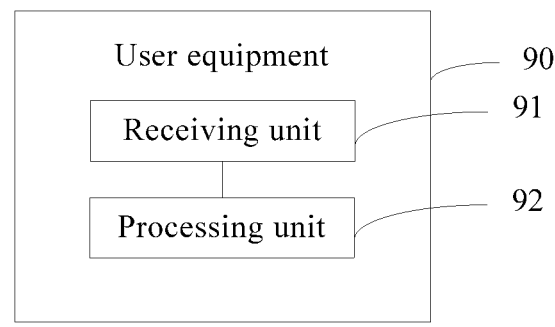
FIG. 9 is a schematic structural diagram 2 of user equipment according to an embodiment of the present invention.

An embodiment of the present invention further provides user equipment 90. As shown in FIG. 9, the user equipment 90 includes: a receiving unit 91, configured to receive system information SI sent by a master eNodeB MeNB, where the SI includes a system frame number SFN of at least one eNodeB eNB adjacent to the MeNB, or indication information used to indicate whether a system frame number SFN of each eNB and an SFN of the MeNB have same parity. The receiving unit 91 is further configured to receive radio resource control RRC connection reconfiguration signaling sent by the MeNB, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB. The user equipment 90 also includes a processing unit 92, configured to select a radio frame and a radio subframe from physical random access channel PRACH configuration according to the received indication information or the SFN of the SeNB, to perform random access to the SeNB.

Optionally, the processing unit 92 is further configured to: when the SI includes the indication information, determine whether the SFN of the SeNB is an odd number or an even number according to the received indication information and the SFN of the MeNB; and if the SFN of the SeNB is an odd number, delay, according to a time corresponding to the SFN of the MeNB, a preset time to determine that the SFN of the SeNB is converted to an even number, and select, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

Optionally, the processing unit 92 is further configured to: when the SI includes the SFN of the SeNB, if the SFN of the SeNB is an odd number, delay, according to a time corresponding to the SFN of the MeNB, a preset time to determine that the SFN of the SeNB is converted to an even number, and select, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

According to the user equipment UE provided in this embodiment of the present invention, the UE receives system information SI sent by an MeNB, where the SI includes an SFN of at least one eNodeB eNB adjacent to the MeNB, or indication information used to indicate whether an SFN of each eNB and an SFN of the MeNB have same parity. The UE receives RRC connection reconfiguration signaling sent by the MeNB, where the RRC connection reconfiguration signaling is used to instruct the UE to use one eNB in the at least one eNodeB eNB as an SeNB of the UE and execute pSCell configuration at the SeNB. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 10:
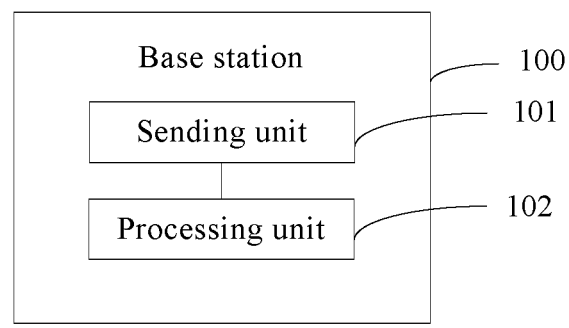
FIG. 10 is a schematic structural diagram 2 of a base station according to an embodiment of the present invention.

An embodiment of the present invention further provides a base station 100. As shown in FIG. 10, the base station 100 includes: a sending unit 101, configured to send system information SI to user equipment, where the SI includes a system frame number SFN of at least one eNodeB eNB adjacent to the eNodeB, or indication information used to indicate whether a system frame number SFN of each eNB and an SFN of the MeNB have same parity; where the sending unit 101 is further configured to send radio resource control RRC connection reconfiguration signaling to the user equipment, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB; and a processing unit 102, configured to enable the user equipment to select a radio frame and a radio subframe from physical random access channel PRACH configuration according to the received indication information or the SFN of the SeNB, to perform random access to the SeNB.

According to the base station provided in this embodiment of the present invention, an eNodeB sends system information SI to UE, where the SI includes an SFN of at least one eNodeB eNB adjacent to the MeNB, or indication information used to indicate whether an SFN of each eNB and an SFN of the MeNB have same parity; the eNodeB sends RRC connection reconfiguration signaling to the UE, where the RRC connection reconfiguration signaling is used to instruct the UE to use one eNB in the at least one eNodeB eNB as an SeNB of the UE and execute pSCell configuration at the SeNB; and the eNodeB enables the UE to select a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 11:
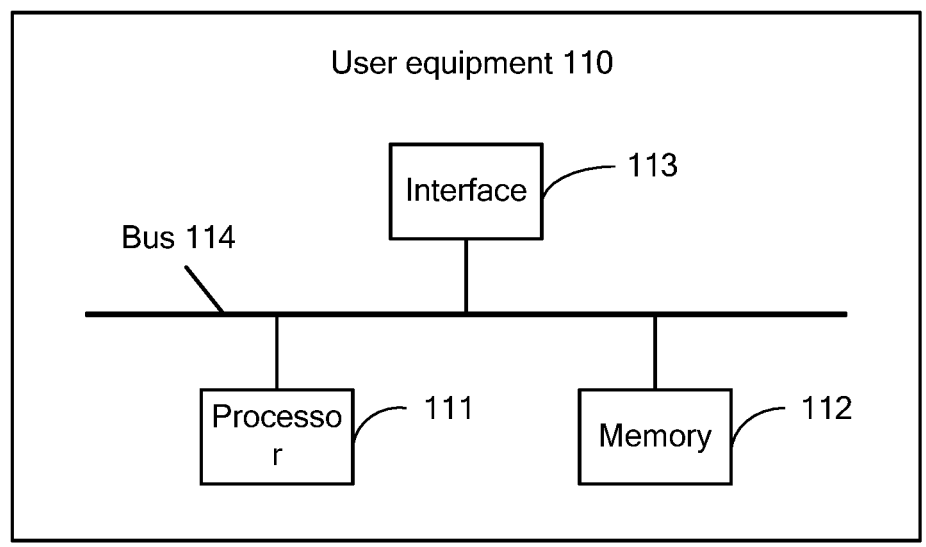
FIG. 11 is a schematic structural diagram 3 of user equipment according to an embodiment of the present invention.

An embodiment of the present invention provides user equipment 110. As shown in FIG. 11, the user equipment no includes: a bus 114, a processor 111 connected to the bus 114, a memory 112, and an interface 113, where the interface 113 is configured for communication, the memory 112 is configured to store computer code, and the processor 111 configured to execute the computer code is configured to: receive radio resource control RRC connection reconfiguration signaling sent by a master eNodeB MeNB, where the RRC connection reconfiguration signaling is used to instruct the user equipment to execute primary secondary cell pSCell configuration at a secondary eNodeB SeNB; and the RRC connection reconfiguration signaling includes an SFN of the SeNB, or indication information used to indicate whether a system frame number SFN of the MeNB and an SFN of the SeNB have same parity; and select a radio frame and a radio subframe from physical random access channel PRACH configuration according to the received indication information or the SFN of the SeNB, to perform random access to the SeNB.

Optionally, that the processor 111 configured to execute the computer code is configured to select a radio frame and a radio subframe from the physical random access channel PRACH configuration according to the received indication information or the SFN of the SeNB, to perform the random access to the SeNB specifically includes: when the RRC connection reconfiguration signaling includes the indication information, determining whether the SFN of the SeNB is an odd number or an even number according to the received indication information and the SFN of the MeNB; and if the SFN of the SeNB is an odd number, delaying, according to a time corresponding to the SFN of the MeNB, a preset time to determine that the SFN of the SeNB is converted to an even number, and selecting, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, from the PRACH configuration according to a time corresponding to the SFN of the MeNB, an even radio frame corresponding to the SFN of the SeNB and a radio subframe corresponding to the even radio frame, to perform the random access to the SeNB.

Optionally, that the processor 111 configured to execute the computer code is configured to select a radio frame and a radio subframe from the physical random access channel PRACH configuration according to the received indication information or the SFN of the SeNB, to perform the random access to the SeNB specifically includes: when the RRC connection reconfiguration signaling includes the SFN of the SeNB, if the SFN of the SeNB is an odd number, delaying, according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, from the PRACH configuration according to a time corresponding to the SFN of the MeNB, an even radio frame corresponding to the SFN of the SeNB and a radio subframe corresponding to the even radio frame, to perform the random access to the SeNB.

According to the user equipment (UE) provided in this embodiment of the present invention, the UE receives RRC connection reconfiguration signaling sent by an MeNB, where the RRC connection reconfiguration signaling is used to instruct the UE to execute pSCell configuration at an SeNB; and the RRC connection reconfiguration signaling includes an SFN of the SeNB, or indication information used to indicate whether an SFN of the MeNB and an SFN of the SeNB have same parity. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 12:
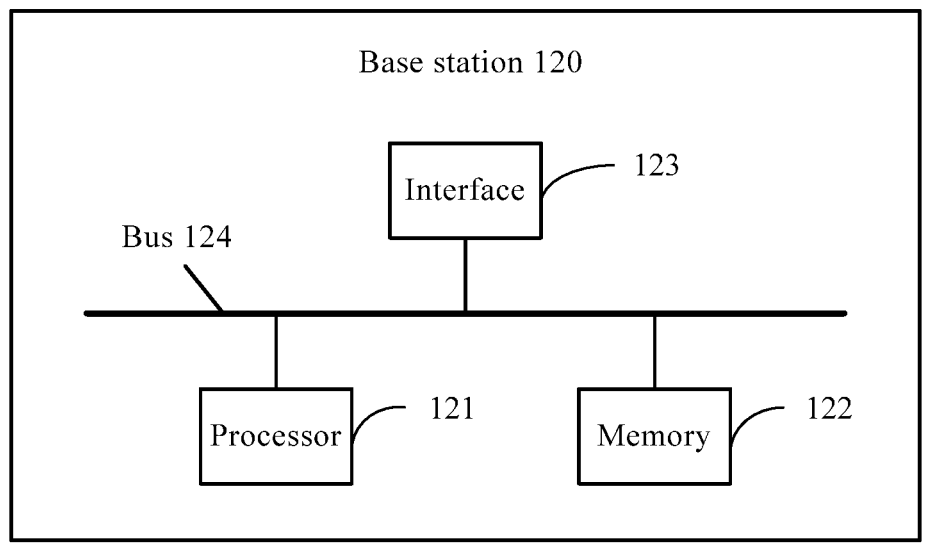
FIG. 12 is a schematic structural diagram 3 of a base station according to an embodiment of the present invention.

An embodiment of the present invention provides a base station 120. As shown in FIG. 12, the base station 120 includes: a bus 124, a processor 121 connected to the bus 124, a memory 122, and an interface 123, where the interface 123 is configured for communication, the memory 122 is configured to store computer code, and the processor 121 configured to execute the computer code is configured to: determine radio resource control RRC connection reconfiguration signaling, where the RRC connection reconfiguration signaling is used to instruct user equipment to execute primary secondary cell pSCell configuration at a secondary eNodeB SeNB; and the RRC connection reconfiguration signaling includes an SFN of the SeNB, or indication information used to indicate whether a system frame number SFN of an MeNB and an SFN of the SeNB have same parity; and send the RRC connection reconfiguration signaling to the user equipment.

According to the base station provided in this embodiment of the present invention, first, an eNodeB determines RRC connection reconfiguration signaling, where the RRC connection reconfiguration signaling is used to instruct UE to execute pSCell configuration at an SeNB; and the RRC connection reconfiguration signaling includes an SFN of the SeNB, or indication information used to indicate whether an SFN of the MeNB and an SFN of the SeNB have same parity. Then the eNodeB sends the RRC connection reconfiguration signaling to the UE, and then the UE completes the pSCell configuration at the SeNB according to the RRC connection reconfiguration signaling. Therefore, when performing the random access to the SeNB, the UE may determine parity of the SFN of the SeNB without a need of reading a PBCH of the SeNB, thereby reducing a time for completing the pSCell configuration.

Figure 13:
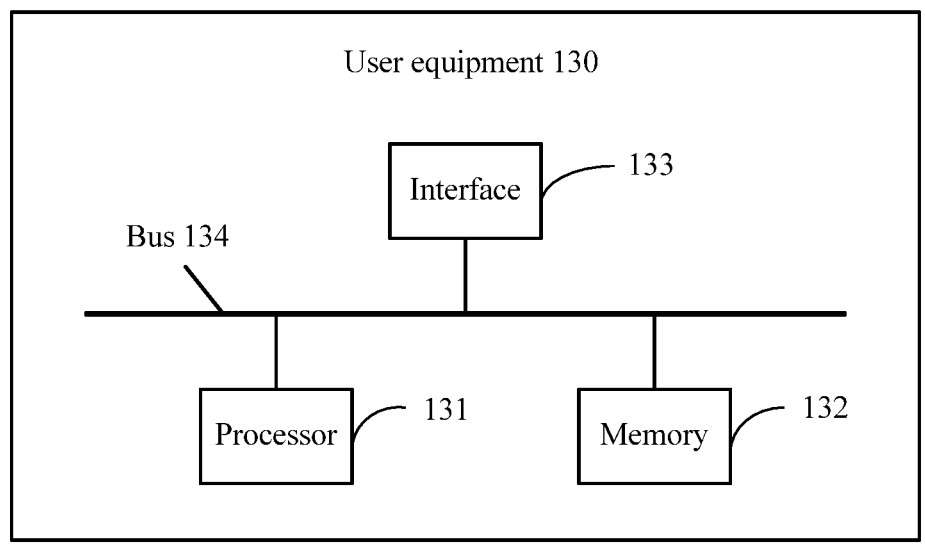
FIG. 13 is a schematic structural diagram 4 of user equipment according to an embodiment of the present invention.

An embodiment of the present invention provides user equipment 130. As shown in FIG. 13, the user equipment 130 includes: a bus 134, a processor 131 connected to the bus 134, a memory 132, and an interface 133, where the interface 133 is configured for communication, the memory 132 is configured to store computer code, and the processor 131 configured to execute the computer code is configured to: receive system information SI sent by a master eNodeB MeNB, where the SI includes a system frame number SFN of at least one eNodeB eNB adjacent to the MeNB, or indication information used to indicate whether a system frame number SFN of each eNB and an SFN of the MeNB have same parity; receive radio resource control RRC connection reconfiguration signaling sent by the MeNB, where the RRC connection reconfiguration signaling is used to instruct the user equipment to use one eNB in the at least one eNodeB eNB as a secondary eNodeB SeNB of the UE, and execute primary secondary cell pSCell configuration at the SeNB; and select a radio frame and a radio subframe from physical random access channel PRACH configuration according to the received indication information or the SFN of the SeNB, to perform random access to the SeNB.

Optionally, that the processor 131 configured to execute the computer code is configured to select a radio frame and a radio subframe from the physical random access channel PRACH configuration according to the received indication information or the SFN of the SeNB, to perform the random access to the SeNB specifically includes: when the SI includes the indication information, determining whether the SFN of the SeNB is an odd number or an even number according to the received indication information and the SFN of the MeNB; and if the SFN of the SeNB is an odd number, delaying, according to a time corresponding to the SFN of the MeNB, a preset time to determine that the SFN of the SeNB is converted to an even number, and selecting, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, from the PRACH configuration according to a time corresponding to the SFN of the MeNB, an even radio frame corresponding to the SFN of the SeNB and a radio subframe corresponding to the even radio frame, to perform the random access to the SeNB.

Optionally, that the processor 131 configured to execute the computer code is configured to select a radio frame and a radio subframe from the physical random access channel PRACH configuration according to the received indication information or the SFN of the SeNB, to perform the random access to the SeNB specifically includes: when the SI includes the SFN of the SeNB, if the SFN of the SeNB is an odd number, delaying, according to a time corresponding to the SFN of the MeNB, a preset time to determine that the SFN of the SeNB is converted to an even number, and selecting, from PRACH configuration, an even radio frame corresponding to a case in which the SFN of the SeNB is converted to an even number and a radio subframe corresponding to the even radio frame, to perform the random access to the SeNB; or if the SFN of the SeNB is an even number, selecting, from the PRACH configuration according to a time corresponding to the SFN of the MeNB, an even radio frame corresponding to the SFN of the SeNB and a radio subframe corresponding to the even radio frame, to perform the random access to the SeNB.

According to the user equipment UE provided in this embodiment of the present invention, the UE receives system information SI sent by an MeNB, where the SI includes an SFN of at least one eNodeB eNB adjacent to the MeNB, or indication information used to indicate whether an SFN of each eNB and an SFN of the MeNB have same parity. The UE receives RRC connection reconfiguration signaling sent by the MeNB, where the RRC connection reconfiguration signaling is used to instruct the UE to use one eNB in the at least one eNodeB eNB as an SeNB of the UE and execute pSCell configuration at the SeNB. The UE selects a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

Figure 14:
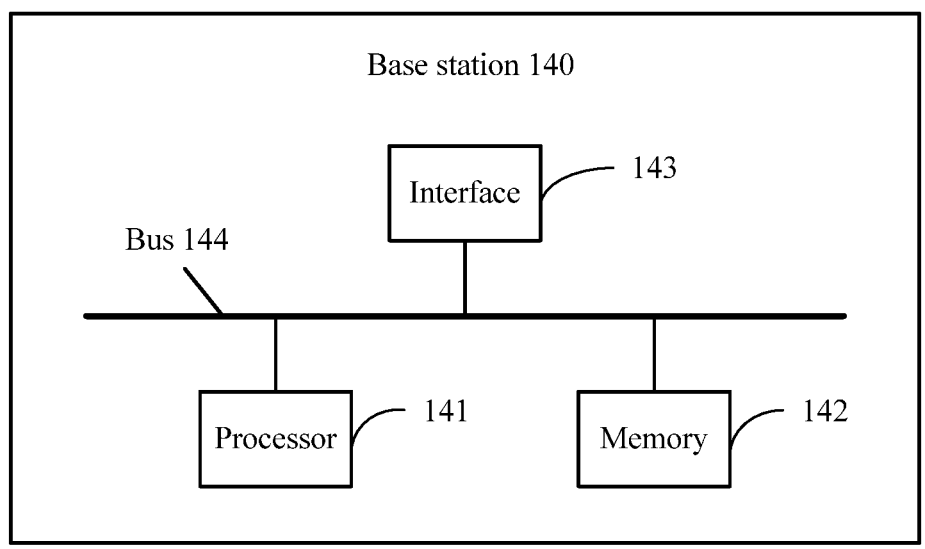
FIG. 14 is a schematic structural diagram 4 of a base station according to an embodiment of the present invention.

An embodiment of the present invention provides a base station 140. As shown in FIG. 14, the base station 140 includes: a bus 144, a processor 141 connected to the bus 144, a memory 142, and an interface 143, where the interface 143 is configured for communication, the memory 142 is configured to store computer code, and the processor 141 configured to execute the computer code is configured to: send system information SI to user equipment, where the SI includes a system frame number SFN of at least one eNodeB eNB adjacent to the MeNB, or indication information used to indicate whether a system frame number SFN of each eNB and an SFN of the MeNB have same parity; send radio resource control RRC connection reconfiguration signaling to the user equipment, where the RRC connection reconfiguration signaling is used to instruct the user equipment to use one eNB in the at least one eNodeB eNB as a secondary eNodeB SeNB of the user equipment, and execute primary secondary cell pSCell configuration at the SeNB; and enable the UE to select a radio frame and a radio subframe from physical random access channel PRACH configuration according to the received indication information or the SFN of the SeNB, to perform random access to the SeNB.

According to the base station provided in this embodiment of the present invention, an eNodeB sends system information SI to UE, where the SI includes an SFN of at least one eNodeB eNB adjacent to the MeNB, or indication information used to indicate whether an SFN of each eNB and an SFN of the MeNB have same parity; the eNodeB sends RRC connection reconfiguration signaling to the UE, where the RRC connection reconfiguration signaling is used to instruct the UE to use one eNB in the at least one eNodeB eNB as an SeNB of the UE and execute pSCell configuration at the SeNB; and the eNodeB enables the UE to select a radio frame and a radio subframe from PRACH configuration according to the received indication information or the SFN of the SeNB, to perform random access to the SeNB. Therefore, when performing the random access to the SeNB, the UE may determine parity of the SFN of the SeNB without a need of reading a PBCH of the SeNB, thereby reducing a time for completing the pSCell configuration.

It should be noted that the processor in the foregoing four embodiments may be a processor or may be a collective term of multiple processing elements. For example, the processor may be a central processing unit (CPU), or an application specific integrated circuit (ASIC), or may be configured as one or more integrated circuits implementing this embodiment of the present invention, for example, one or more microprocessors (digital signal processors, DSP) or one or more field programmable gate arrays (FPGA).

The memory may be one storage apparatus or may be a collective term of multiple storage elements, and is configured to store executable program code or a parameter, data, and the like that are required for running an access network management device. The memory may include a random access memory (RAM) or may include a non-volatile memory, such as a magnetic disk storage or a flash memory.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus, which, however, does not mean that there is only one bus or only one type of bus.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein again.

Persons of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention.

Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving, by user equipment (UE), radio resource control (RRC) connection reconfiguration signaling sent by a master eNodeB (MeNB), wherein the RRC connection reconfiguration signaling instructs the UE to execute primary secondary cell (pSCell) configuration at a secondary eNodeB (SeNB), and wherein the RRC connection reconfiguration signaling comprises a system frame number (SFN) of the SeNB, or indication information indicating whether an SFN of the MeNB and an SFN of the SeNB have same parity;
   determining, by the UE, whether the SFN of the SeNB is an odd number or an even number according to the received SFN of the SeNB, or according to the received indication information and the SFN of the MeNB; and
   selecting, by the UE, a radio frame and a radio subframe from physical random access channel (PRACH) configuration, to perform random access to the SeNB, wherein the radio frame and the radio subframe are selected according to the determination of whether the SFN of the SeNB is an odd number or an even number.

2. The method according to claim 1, wherein the RRC connection reconfiguration signaling comprises the indication information, and selecting, by the UE, the radio frame and the radio subframe from the PRACH configuration to perform random access to the SeNB comprises:
   when the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB.

3. The method according to claim 1, wherein the RRC connection reconfiguration signaling comprises the SFN of the SeNB, and selecting, by the UE, the radio frame and the radio subframe from the PRACH configuration to perform random access to the SeNB comprises:
   when the SFN of the SeNB is an odd number, delaying, by the UE according to a time corresponding to the SFN of the MeNB, a preset time to determine that the SFN of the SeNB is converted to an even number, and selecting, from the PRACH configuration, an even radio frame corresponding to a case in which the SFN of the SeNB is converted to an even number and a radio subframe corresponding to the even radio frame, to perform the random access to the SeNB.

4. The method according to claim 1, wherein the RRC connection reconfiguration signaling comprises the indication information, and selecting, by the UE, the radio frame and the radio subframe from the PRACH configuration to perform random access to the SeNB comprises:
   when the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

5. The method according to claim 1, wherein the RRC connection reconfiguration signaling comprises the SFN of the SeNB, and selecting, by the UE, the radio frame and the radio subframe from the PRACH configuration to perform random access to the SeNB comprises:
   when the SFN of the SeNB is an even number, selecting, by the UE from the PRACH configuration according to a time corresponding to the SFN of the MeNB, an even radio frame corresponding to the SFN of the SeNB and a radio subframe corresponding to the even radio frame, to perform the random access to the SeNB.

6. A method, comprising:
   determining, by a master eNodeB (MeNB), radio resource control (RRC) connection reconfiguration signaling, wherein the RRC connection reconfiguration signaling instructs user equipment (UE) to execute primary secondary cell (pSCell) configuration at a secondary eNodeB (SeNB), and wherein the RRC connection reconfiguration signaling comprises a system frame number (SFN) of the SeNB, or indication information indicating whether an SFN of the MeNB and an SFN of the SeNB have same parity; and
   sending, by the MeNB, the RRC connection reconfiguration signaling to the UE, wherein the UE determines whether the SFN of the SeNB is an odd number or an even number according to the received SFN of the SeNB, or according to the received indication information and the SFN of the MeNB, and wherein the UE selects a radio frame and a radio subframe from a physical random access channel (PRACH) configuration to perform random access to the SeNB, wherein the radio frame and the radio subframe are selected by the UE according to the determination of whether the SFN of the SeNB is an odd number or an even number.

7. The method according to claim 6, wherein the RRC connection reconfiguration signaling comprises the SFN of the SeNB.

8. The method according to claim 6, wherein the RRC connection reconfiguration signaling comprises the indication information indicating whether the SFN of the MeNB and the SFN of the SeNB have same parity.

9. User equipment, comprising:
   a communications interface;
   a non-transitory memory; and
   a processor;
   wherein the communications interface is configured to communicate with a network element;
   wherein the non-transitory memory is configured to store computer code; and
   wherein the processor, when executing the computer code, is configured to:

receive radio resource control (RRC) connection reconfiguration signaling sent by a master eNodeB (MeNB), wherein the RRC connection reconfiguration signaling instructs the user equipment to execute primary secondary cell (pSCell) configuration at a secondary eNodeB (SeNB); and wherein the RRC connection reconfiguration signaling comprises a system frame number (SFN) of the SeNB, or indication information indicating whether an SFN of the MeNB and an SFN of the SeNB have same parity;

determine whether the SFN of the SeNB is an odd number or an even number according to the received SFN of the SeNB, or according to the received indication information and the SFN of the MeNB; and select a radio frame and a radio subframe from physical random access channel (PRACH) configuration to perform random access to the SeNB, wherein the radio frame and the radio subframe are selected according to the determination of whether the SFN of the SeNB is an odd number or an even number.

10. The user equipment according to claim 9, wherein the RRC connection reconfiguration signaling comprises the indication information, and wherein the processor, when executing the computer code, is further configured to:

when the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB.

11. The user equipment according to claim 9, wherein the processor, when executing the computer code, is further configured to:

when the RRC connection reconfiguration signaling comprises the SFN of the SeNB, and when the SFN of the SeNB is an odd number, delay, according to a time corresponding to the SFN of the MeNB, a preset time to determine that the SFN of the SeNB is converted to an even number, and select, from the PRACH configuration, an even radio frame corresponding to a case in which the SFN of the SeNB is converted to an even number and a radio subframe corresponding to the even radio frame, to perform the random access to the SeNB.

12. The user equipment according to claim 9, wherein the RRC connection reconfiguration signaling comprises the indication information, and wherein the processor, when executing the computer code, is further configured to:

when the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

13. The user equipment according to claim 9, wherein the processor, when executing the computer code, is further configured to:

when the RRC connection reconfiguration signaling comprises the SFN of the SeNB, and when the SFN of the SeNB is an even number, select, from the PRACH configuration according to a time corresponding to the SFN of the MeNB, an even radio frame corresponding to the SFN of the SeNB and a radio subframe corresponding to the even radio frame, to perform the random access to the SeNB.

14. A base station, comprising:
a communications interface;
a memory; and
a processor;
wherein the communications interface is configured to communicate with a network element;
wherein the memory is configured to store computer code; and
wherein the processor, when executing the computer code, is configured to:

determine radio resource control (RRC) connection reconfiguration signaling, wherein the RRC connection reconfiguration signaling instructs user equipment to execute primary secondary cell (pSCell) configuration at a secondary eNodeB (SeNB); and wherein the RRC connection reconfiguration signaling comprises a system frame number (SFN) of the SeNB, or indication information indicating whether an SFN of the MeNB and an SFN of the SeNB have same parity; and send the RRC connection reconfiguration signaling to the user equipment, wherein the UE determines whether the SFN of the SeNB is an odd number or an even number according to the received SFN of the SeNB, or according to the received indication information and the SFN of the MeNB, and wherein the UE selects a radio frame and a radio subframe from physical random access channel (PRACH) configuration to perform random access to the SeNB, wherein the radio frame and the radio subframe are selected by the UE according to the determination of whether the SFN of the SeNB is an odd number or an even number.

15. The base station according to claim 14, wherein the RRC connection reconfiguration signaling comprises the SFN of the SeNB.

16. The base station according to claim 14, wherein the RRC connection reconfiguration signaling comprises the indication information indicating whether the SFN of the MeNB and the SFN of the SeNB have same parity.

* * * * *